J. S. DE HAVEN.
HAY LOADER.
No. 36,208. Patented Aug. 19, 1862.
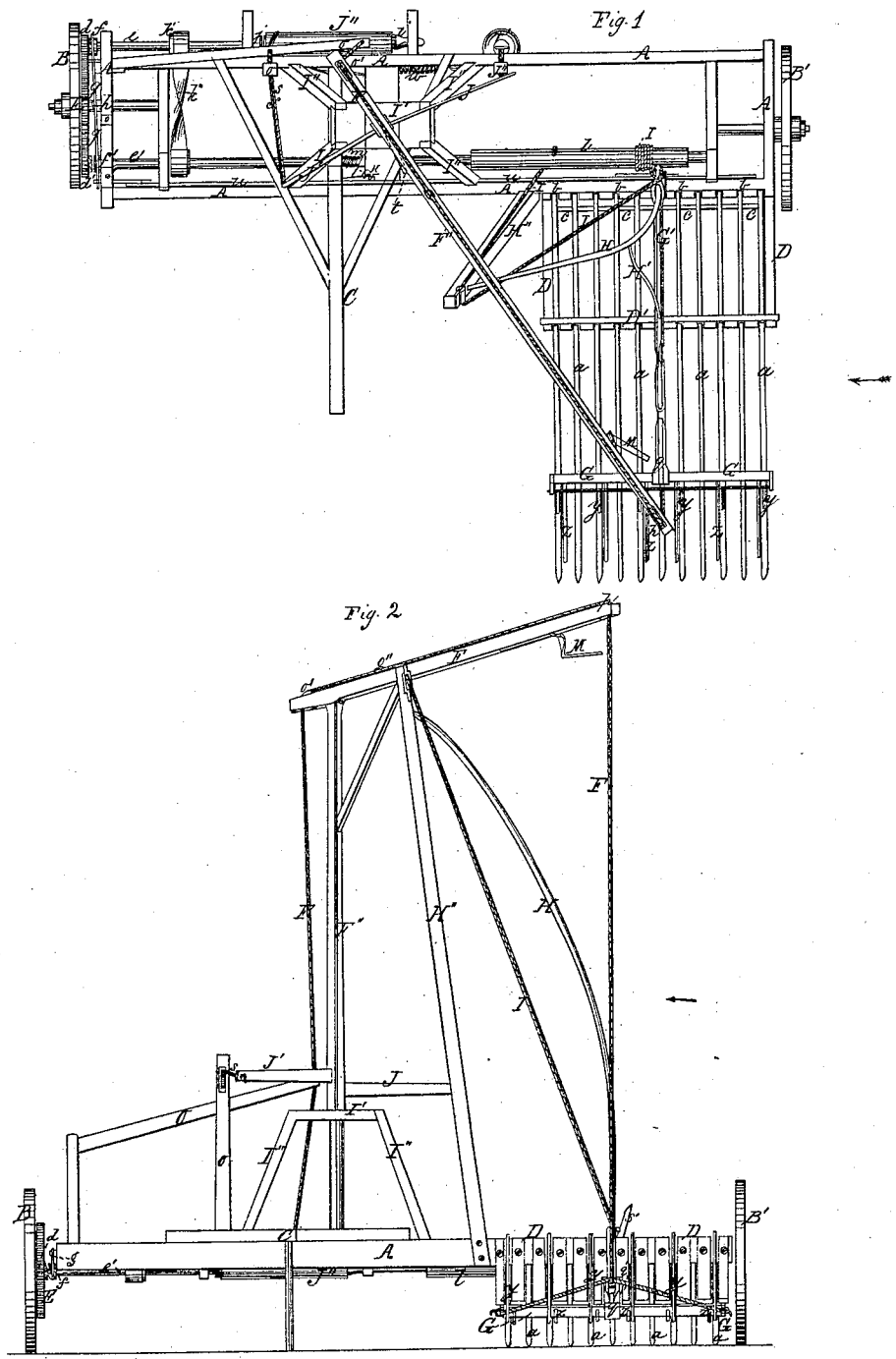

2 Sheets—Sheet 2.
J. S. DE HAVEN.
HAY LOADER.
No. 36,208. Patented Aug. 19, 1862.
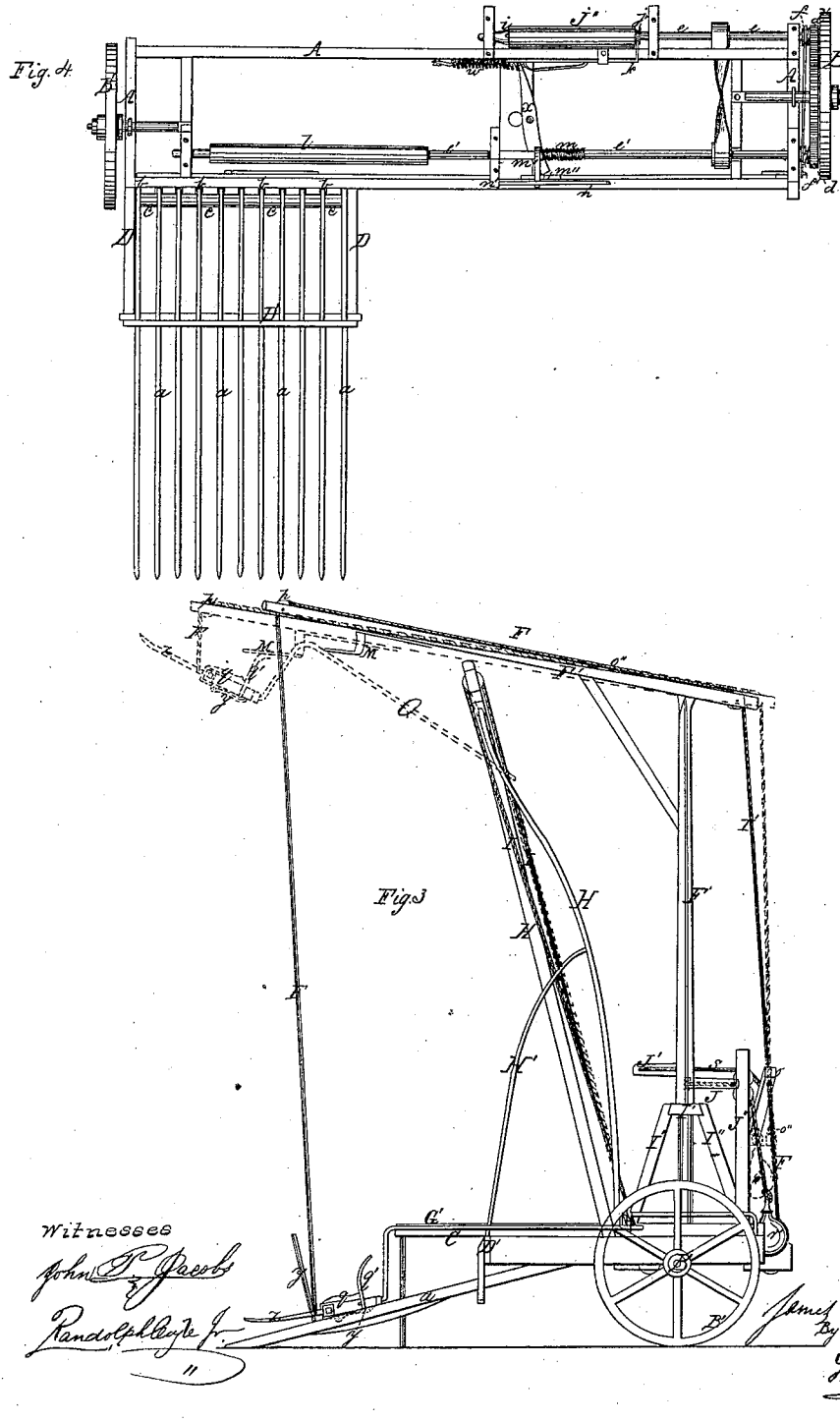

UNITED STATES PATENT OFFICE.

JAMES S. DE HAVEN, OF AKRON, OHIO.

IMPROVEMENT IN MACHINES FOR LOADING AND PITCHING HAY.

Specification forming part of Letters Patent No. 36,208, dated August 19, 1862.

*To all whom it may concern:*

Be it known that I, JAMES S. DE HAVEN, of Akron, in the county of Summit and State of Ohio, have invented certain new and useful Improvements in Machines for Loading and Pitching Hay; and I do hereby declare that the following is a full, clear, and exact description of the same, reference being had to the accompanying drawings, forming a part of this specification, and in which—

Figure 1 represents a plan or top view of the machine. Fig. 2 represents a front view. Fig. 3 represents in black lines a side view looking in the direction of arrow 1, Figs. 1 and 2; and Fig. 4 represents a bottom view of the rear part of the machine, given to illustrate the position and relative arrangement of the main gearing and the parts more nearly connected therewith.

In the drawings, A A A A represent the main frame, which is supported by two wheels, B B'—one at each end.

To the top of the frame A, and a little to to one side of the center thereof, is fastened a reach or pole, C. From the front of the left end of the frame projects forward a narrow frame, D D, the front piece, D', of which is slotted out to allow the long inclined rake-teeth $a$ $a$ $a$ to pass through the same and have free play up and down, so as to conform to the inequalities of the surface of the ground. The rear ends of the rake-teeth $a$ fit into grooves $b$ $b$ in the front piece of frame A, where they are held by a long bolt or rod, $c$, which passes through frame D and loosely through holes in the rear ends of the teeth $a$, as fully indicated in the drawings.

Wheel B has on its inner side a cog-wheel, E, which takes into two small clutch-gears, $d'$ $d'$, loose on the ends of their respective shafts, $e$ $e'$. Upon shaft $e$ is placed a clutch, $f'$, while upon shaft $e'$ is placed a similar clutch, $f'$, both clutches being so made that they always turn with their respective shafts, while at the same time they are free to slide back and forth thereon. Both clutches are grooved out to receive the ends of a shipping lever or bar, $g$, which is hinged or fulcrumed near its center, as seen at $h$. It will thus be seen that when one clutch is thrown into action with the clutch on its gear the other clutch will be out of mesh with its clutch-gear. Shaft $e$ is supported in suitable bearings on the rear side of frame A, and is provided with a long, loose, windlass-pulley, J'', one end of which is grooved out, as seen at $j$, to receive the end of shipper $k$, while the other end is made in clutch form to fit clutch $i$, fast on the end of shaft $e$. Shaft $e$ has also a fast pulley, $k'$, to receive a cross-belt, $k''$, from a similar pulley on shaft $e'$. Shaft $e'$ is much longer than shaft $e$, and extends in rear of the rake-teeth, and has fast on that end a windlass-pulley, $l$, while it carries a screw-thimble, $m$, made fast near its center, which screws into and works the sliding shipping-piece $m'$, having a small front projection which works between a spring, $n$, and the bottom of the front piece of the main frame, one end of spring $n$ only being fastened, the other end being left free to work back and forth in a groove cut in the cap or box piece $n'$.

A chain or rope, F, runs from pulley J'' up through the end of lever $o$, thence up and over a pulley, $o'$, in the rear end of crane F', thence along over crane F' and down over a pulley, $p$, on its front end, and is connected to the fork-head G by a chain or rope, as indicated in the drawings. The fork-head is connected to its handle G' by a joint at $p'$, but is held from turning down by its rear projection $q$ catching under a swinging catch, $q'$, hinged at $q''$. The rear part of the fork-handle is constructed and arranged so as to slide freely up and down upon the inclined guides H H', the guide H extending from frame A, near the center of the rear rake, to near the top of the windlass-post H'', while guide H' extends from the center of piece D' to about the middle of guide-piece H.

A rope or chain, I, is attached at one end to pulley $l$. Then, after having been coiled or wound upon said pulley a sufficient number of times, it is fastened to the end of fork-handle G', thence passed up and over a pulley in the top of post H'', thence down and made fast to the other end of pulley $l$, in such a manner that as one end of rope I is unwound from pulley $l$, the other end will be wound up.

The crane-post F'' is stepped in a cross-piece, I', and is supported by a frame, I''. This post has two arms, J J', arm J being held close up to a post or stand, J''', by means of a rope, $r$, and weight $r'$, while arm J' is connected to arm $o$ by a cord or chain, $s$. Post F'' also carries, near its bottom, a short arm or dog, $t$, to operate the shipping slide-pieces $u$ by striking against lug $v$ on its inner side. The slide-piece $u$ is connected at its outer end to the shipping-lever $g$, and has at its other end an upright cam, $s'$. Shipper $k$ is made to draw loose pulley $J''$ in mesh with clutch $i$ of shaft $e$ by means of a spring, $w$, and said pulley so remains in mesh only when shipper $k$ is operated upon by lever $x$, one end of which fits into a notch in shipper $k$, and the other end extends out so as to be operated upon by an upward projection on the sliding shipping-piece $m'$, through which works the screw $m$ on shaft $e$.

Operation: The reach or pole C is to be connected to the rear of the body of the cart or other carriage designed to receive the hay, so as to bring the body of the cart at the side of rake-teeth and to the right of the fork-head. The team is then driven forward, when the rake-teeth will run under the hay and elevate and cause it to slide back against their upright guards $y$. As soon as the slack of the rope or chain E has been taken up by the pulley $j$ the fork-head, together with the hay upon its tines $z$, is suddenly and quickly elevated by the winding up of rope or chain F, while the rear end of the fork-handle is also elevated by the winding up of rope I on pulley $l$, near the post H'', as fast as it is unwound from the other end, shaft $e'$ being turned by the cross-belt from shaft $e$ in this instance. As the fork, with its load of hay, is elevated, it swings or is guided by guides H H' toward the cart, and when it has reached a sufficient elevation to clear the load a projection or catch-piece, $o''$, fastened to rope or chain F, strikes against the upper side of lever $o$ and causes that to descend, thus drawing arm J' back, which causes the crane-post F'' to swing around so as to bring the fork, with its load of hay, directly above the body of the cart, when the catch $q'$, coming in contact with a cam-piece, M, on the crane F', is forced back, thereby permitting the fork-head to swing forward upon its hinge, when the hay falls upon the load or cart. As soon as this takes place the short arm $t$ on the bottom of crane-post F'' strikes against lug $r$ on the shipping slide-piece $u$, whereby the latter is moved sufficiently to throw clutch $f$ on shaft $e$ out of mesh and clutch $f'$ on shaft $e'$ into mesh. The pulleys $j$ and $l$ and the shafts $e'$ $e$ are now turned in reverse directions, the latter being turned by the cross-belt from shaft $e'$. As the operation progresses rope or chain F is unwound from pulley J'', while rope or chain I is unwound from the inner end of pulley $l$ and wound up on the other end. The fork is thus permitted to descend, while as the end of lever $o$ is allowed to rise weight $r'$ draws crane F' and its post F'' back toward the position shown in Figs. 1 and 2. As soon as the fork is swung clear of the load the shipping-piece $m'$ is caused to move against the end of lever $x$ by means of screw $m$ on shaft $e'$, thereby causing the shipper $k$ to slide pulley J'' out of mesh with clutch $i$, when the head of the fork and its tines are allowed to drop suddenly down upon the rake-teeth, pulley $j$ freely turning on shaft $e$, whereby the tines are lowered in season to avoid their coming on top of the hay on the rake-teeth. When the rear end of the fork-handle descends it is drawn against the inclined cam $s'$, whereby shipper $u$ is slid back, thereby causing lever $g$ to unclutch clutch $f'$ and clutch $f$. At the same time the sliding shipping-piece $m'$ is depressed by a cam-piece, $m''$, so as to free lever $x$, thus allowing spring $w$ to draw pulley $j$ into mesh with clutch $i$ for again elevating the fork, as before stated. It will thus be seen that the whole operation is automatic. The relative position of the driving-wheel and rake is such that nearly all side draft is obviated, while the parts are so constructed and arranged as to combine simplicity and durability.

Having described one practical mode of applying my invention to use, what I claim, and desire to secure by Letters Patent, is—

1. The combination of the fork-handle with the guides H H', substantially as set forth.

2. The combination, with shaft $e'$ and lever $x$, of the screw $m$, sliding shifting-piece $m'$, and cam $m''$, for the purposes set forth.

3. The combination, with shaft $e$, of clutch $i$, pulley J'', and shipper $k$, substantially as and for the purpose set forth.

4. The combination and arrangement of mechanism, substantially as set forth, for automatically gathering and loading hay, substantially as described.

In witness whereof I have hereunto subscribed my name.

JAMES S. DE HAVEN.

In presence of—
 HENRY W. HOWE,
 S. A. LANE.